United States Patent [19]

Kato

[11] Patent Number: 4,814,890
[45] Date of Patent: Mar. 21, 1989

[54] IMAGE COMMUNICATING SYSTEM

[75] Inventor: Yoshiaki Kato, Tokyo, Japan

[73] Assignee: Canon Kabushiki Kaisha, Tokyo, Japan

[21] Appl. No.: 798,316

[22] Filed: Nov. 15, 1985

[30] Foreign Application Priority Data

| Nov. 19, 1984 [JP] | Japan | 59-224074 |
| Nov. 19, 1984 [JP] | Japan | 59-244075 |
| Nov. 19, 1984 [JP] | Japan | 59-244076 |
| Nov. 19, 1984 [JP] | Japan | 59-244077 |
| Nov. 19, 1984 [JP] | Japan | 59-244078 |

[51] Int. Cl.$^4$ .............................................. H84N 1/40
[52] U.S. Cl. ................................... 358/280; 358/260; 358/257; 358/287; 379/100
[58] Field of Search ............... 358/257, 260, 261, 284, 358/287

[56] References Cited

U.S. PATENT DOCUMENTS

| 3,558,811 | 1/1971 | Montevecchio | 358/256 |
| 3,751,582 | 8/1973 | Wernikoff et al. | 358/257 |
| 4,054,914 | 10/1977 | Fukuoka | 358/287 |
| 4,386,373 | 5/1983 | Kondo et al. | 358/260 |

FOREIGN PATENT DOCUMENTS

| 2035747A | 6/1980 | United Kingdom . |
| 2055270A | 2/1981 | United Kingdom . |
| 1598026 | 9/1981 | United Kingdom . |
| 2143102A | 1/1985 | United Kingdom . |
| 84/01075 | 3/1984 | World Int. Prop. O. . |

Primary Examiner—Edward L. Coles, Sr.
Attorney, Agent, or Firm—Fitzpatrick, Cella, Harper & Scinto

[57] ABSTRACT

An image communicating system such as a facsimile for transmitting and/or receiving image data. This system comprises a reader to read an original image at the first resolution, a coder to code the image signal of the first resolution obtained by the reader, an image memory to store the signal coded by the coder, a converter to convert the signal read out from the image memory to a signal of a recording resolution on the reception side, and a transmitter to transmit an output signal of the converter. The image memory is commonly used as a reception memory, a broadcasting transmission memory, and a retention memory for multicopy, so that the memory capacity can be reduced. The pixel density of the transmitting image data is converted in accordance with the recording pixel density on the reception side. Thus, the image data of a high quality can be derived and printed by a high-speed laser printer on the reception side without changing the image size.

17 Claims, 9 Drawing Sheets

IMAGE COMMUNICATING SYSTEM

BACKGROUND OF THE INVENTION

1. Field of the Invention

The present invention relates to an image communicating system such as a facsimile apparatus or the like which can transmit and/or receive image data.

2. Description of the Prior Art

Generally, facsimile apparatuses are constituted by: a reading system for optically reading the content of an original to be transmitted and converting to an electrical signal; a recording system for hard-copying by a printer or the like on the basis of the received signal or the like; and a controller for controlling the reading and recording systems.

As a recording system of the facsimile apparatus using a subscriber's telephone line, in general, there has conventionally been used the recording system having a thermal printer using a thermal paper. The thermal printer, however, has a drawback such that the printing speed is slow although it has advantageously a high resolution.

Therefore, in the facsimile apparatuses using subscriber's telephone lines, the recording apparatus having a high resolution and a high enough printing speed is demanded.

To improve both the resolution and the printing speed, there is considered a method whereby a reception memory to store the received data is provided and when a predetermined amount of data (for example, data of one page) has been stored in the reception memory, this data is transmitted to the printer.

On one hand, in the facsimile apparatus, there is considered another method whereby when data has once been received, the same content as this data is multicopied by printing it onto a plurality of print papers. In this case, it is necessary to use a dedicated memory (retention memory) to store the read data or received content.

Further, in the facsimile apparatus, there is considered a method whereby the broadcasting transmitting function to transmit the same data as the read data of an image to other plurality of facsimile apparatuses by a single operation is provided. In this case, it is necessary to use a dedicated memory (memory for broadcasting transmission) to store the read data.

As mentioned above, a reception image memory is needed to print the received image at a high speed, a retention memory is needed to obtain a plurality of recording images from a single image, and a broadcasting transmission memory is needed for the broadcasting transmission.

Namely, a memory of a large capacity is necessary to obtain a high-speed facsimile apparatus with multifunction.

It is assumed that when the facsimile apparatus on the transmission side reads an image data with a high resolution and the pixel density in the main scanning direction is 16 pels/mm and the scanning line density in the subscanning direction is 15.4 lines/mm, those of the facsimile apparatus on the reception side are, for example, 8 pels/mm×7.7 lines/mm or 4 pels/mm×3.85 lines/mm. In this case, since the number of pixels to be transmitted is too large, the received image is magnified in the apparatus on the reception side, so that the whole image cannot be fully printed on a recording paper and the printer becomes the unrecordable state.

On the contrary, in the case where the apparatus on the transmission side reads an image data with a low resolution and the apparatus on the reception side records this image data with a high resolution, the number of pixels transmitted is so small that the size of image data transmitted is reduced and this image data is recorded by the printer on the reception side, so that there is a drawback such that a picture quality of the received image deteriorates.

SUMMARY OF THE INVENTION

It is an object of the present invention to solve the above-mentioned drawbacks of the conventional technologies and to provide an image communicating system such as a facsimile apparatus or the like which can obtain an image of a high picture quality at a high speed.

Another object of the invention is to provide an image communicating system in which in the case of using a recording system of a high printing resolution, reduction of the image size recorded on a paper is prevented.

Still another object of the invention is to provide an image communicating system in which even in the case of transmitting an image data to a receiving apparatus using a recording system of a low printing resolution, the image size on a paper is not magnified.

Still another object of the invention is to provide an image communicating system in which a reception memory to store the received image and a retention memory for multicopy are commonly used, thereby reducing the memory capacity.

Still another object of the invention is to provide an image communicating system in which the reception memory and a broadcasting transmission memory are commonly used, thereby reducing the memory capacity.

Still another object of the invention is to provide an image communicating system in which the retention memory and the broadcasting transmission memory are commonly used, thereby reducing the memory capacity.

Still another object of the invention is to provide an image communicating system in which all of the reception memory, retention memory, and broadcasting transmission memory are commonly used, thereby reducing the memory capacity.

The above and other objects and features of the present invention will become apparent from the following detailed description and the appended claims with reference to the accompanying drawings.

BRIEF DESCRIPTION OF THE DRAWINGS

FIG. 1, comprising

FIG. 5, comprising FIGS. 5A, 5B, 5C and 5D, is a flowchart showing the operation of the embodiment.

DETAILED DESCRIPTION OF THE PREFERRED EMBODIMENT

Figure 1A:
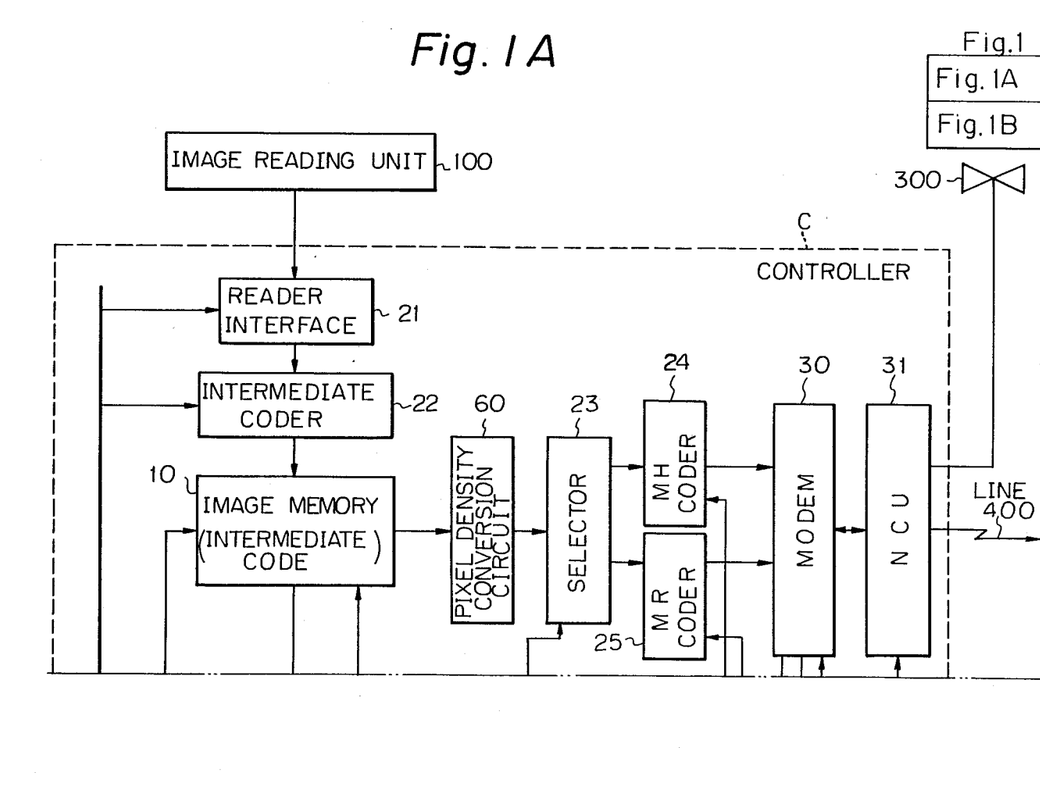
FIGS. 1A and 1B, is a block diagram showing an embodiment of the present invention.
Figure 1B:
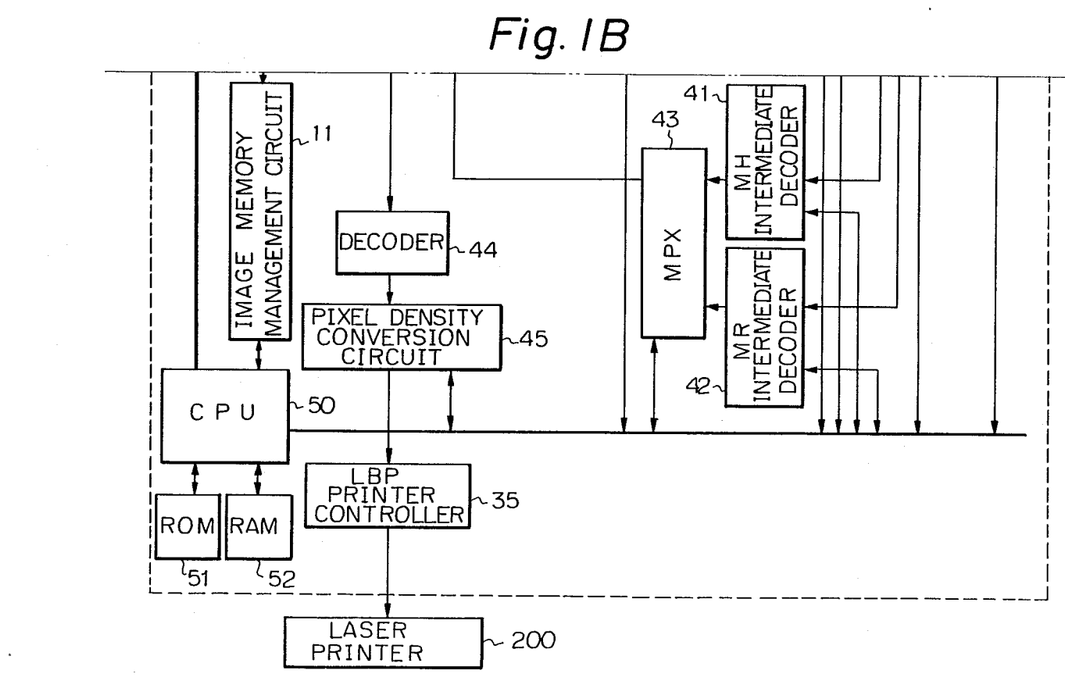

FIG. 1 is a block diagram showing an embodiment of the present invention.

This embodiment comprises an image reading unit 100 serving as an image reading system, a laser printer 200 serving as a recording system, and a controller C for controlling the image reading unit 100 and laser printer 200.

Figure 2:
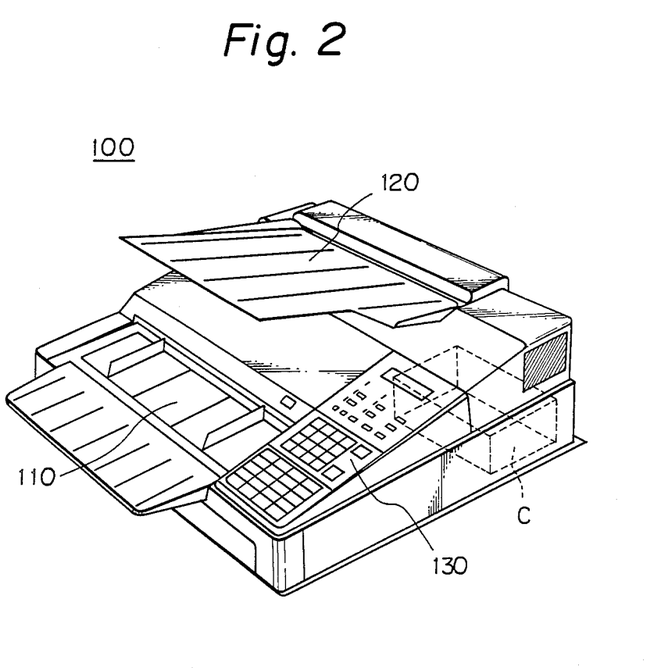
FIG. 2 is a perspective view showing an example of an image reading unit.

FIG. 2 is a perspective view showing the image reading unit 100.

A predetermined original is inserted from an original inserting section 110. Image information of the original is converted to an electrical signal by image reading means provided in the unit 100 and thereafter the original is delivered onto a delivery tray 120. The image reading unit 100 is provided with an operation panel 130 and the controller C for controlling the image reading unit 100 and laser printer 200 is built in the unit 100.

Figure 3:
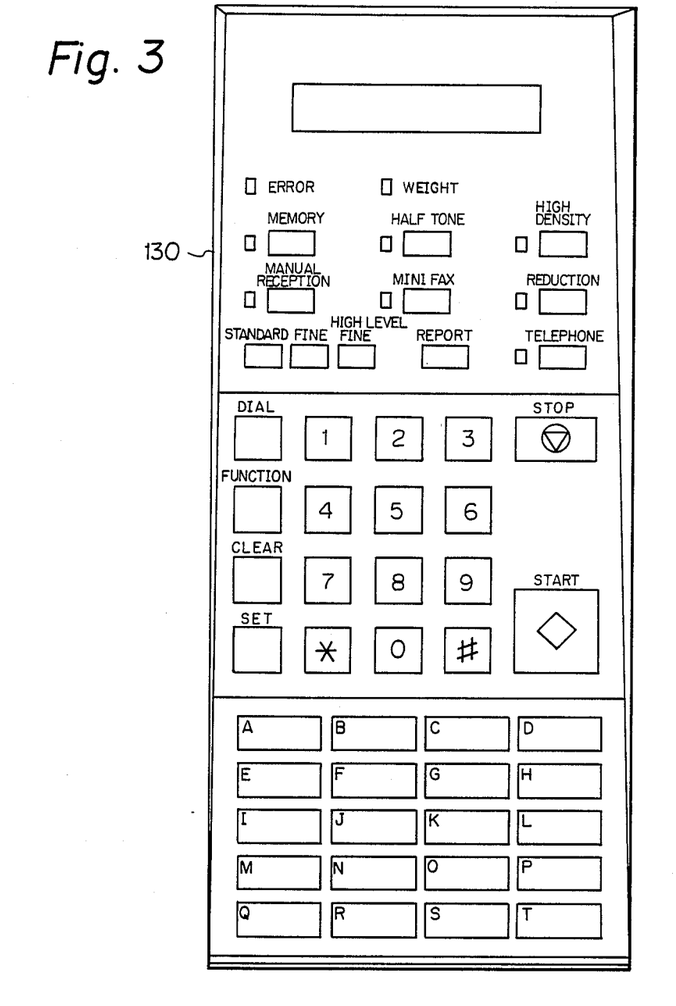
FIG. 3 is a diagram showing an example of an operation panel.

FIG. 3 is a diagram showing the operation panel. The operation panel 130 is used to execute various functions such as selection between the normal mode and the fine mode, designation of mini FAX or half tone, dial operation to call the destination apparatus, and the like.

Figure 4:
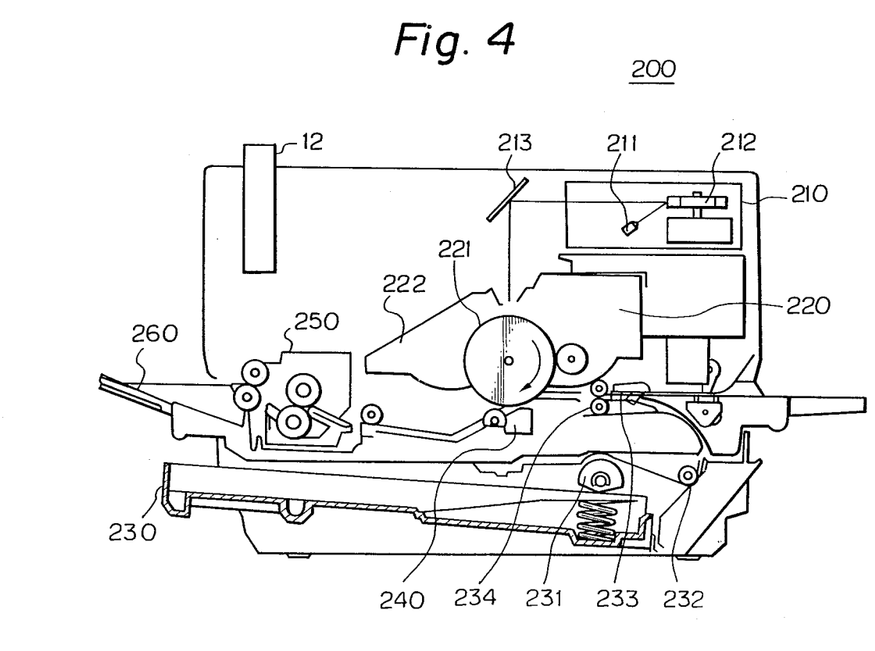
FIG. 4 is a vertical sectional view showing an example of a laser printer.

FIG. 4 is a vertical sectional view showing an example of the laser printer 200.

The laser printer 200 has an exposing device 210, a developing unit 220, a paper feed cassette 230, a transferring unit 240, a fixing unit 250, and a stacking unit 260. The exposing device 210 has a laser unit including a laser 211 and a scanner including a polygon mirror 212.

The developing unit 220 has a photosensitive drum 221 and a cleaner 222 and visualizes the latent image formed on the drum 221 by a reflecting mirror 213.

A paper in the paper feed cassette 230 is fed by a paper feed roller 231 and a conveying roller 232 and temporarily stopped by a resist shutter 233. Thus, the irradiation of the laser and the rotation of the drum 221 are performed synchronously with the paper feed. Thereafter, the paper is sent to the drum 221 by feed-in rollers 234. The toner image is transferred onto the paper in the transferring unit 240 and this toner image is fixed in the fixing unit 250.

A series of operation timings such as the above-mentioned conveyance of the paper, formation of character, development, transfer, fixing, and the like are controlled by way of a laser printer controller 35 which will be explained hereinafter on the basis of the data stored in an image memory 10 which will be explained hereinafter.

Returning to FIG. 1, the controller C will then be described.

The controller C mainly comprises: a transmitting system to transmit the read data from the image reading unit 110 to the destination apparatus; a receiving system to send the received data from the destination apparatus to the laser printer 200; the image memory 10 to store a predetermined image data; and a CPU 50 to control the whole operation of the controller C.

The transmitting system comprises: a reader interface 21; an intermediate coder 22 to convert the read data to an intermediate code; the image memory 10 to store this intermediate code; an image density conversion circuit 60 to reduce (convert) the pixel density in accordance with the function (recording pixel density) of the destination apparatus; a selector 23 to select an MH coder 24 or an MR coder 25 in accordance with the decoding function of the destination apparatus, a modem 30 to modulate a transmitting signal; and an NCU 31 to control the line.

The receiving system comprises: the NCU 31; the modem 30 to demodulate the received signal; an MH intermediate decoder 41 to decode the MH code to the intermediate code; an MR intermediate decoder 42 to decode the MR code to the intermediate code; a multiplexer 43; the image memory 10 to store the intermediate code derived through the multiplexer 43; a pixel density conversion circuit 45 having dot multiplexing means; a decoder 44 to convert the intermediate code to a video signal; and the laser printer controller 35 to control the laser printer 200.

An image memory management circuit 11 performs the whole management of residual memory capacity, writing, readout, and the like of the image memory 10.

The CPU 50 controls the overall operation of the controller C. Its control program is stored in a ROM 51 and each data necessary for execution of this program is stored in a RAM 52.

Upon transmission, the storage data is read out from the image memory 10 and transmitted at a speed in response to a transmitting speed of a line 400. Upon reception, the data of one page is stored in the image memory 10 and then the storage data is sent to the decoder 44. On one hand, in the case of using the image memory 10 as a retention memory, the data is stored therein until the multicopy is ended. In the case of using the image memory 10 as a broadcasting transmission memory, the data is stored therein until the broadcasting transmission is finished. A reference numeral 300 denotes a telephone.

The operation of this embodiment will then be described.

Figures 5, 5A:
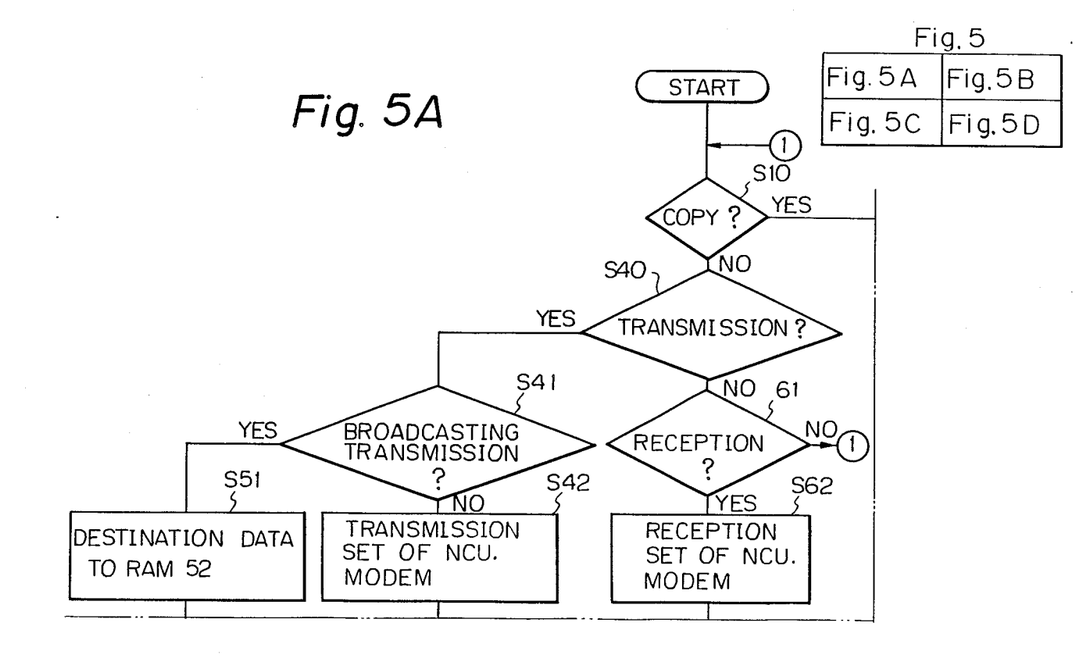
Figure 5B:
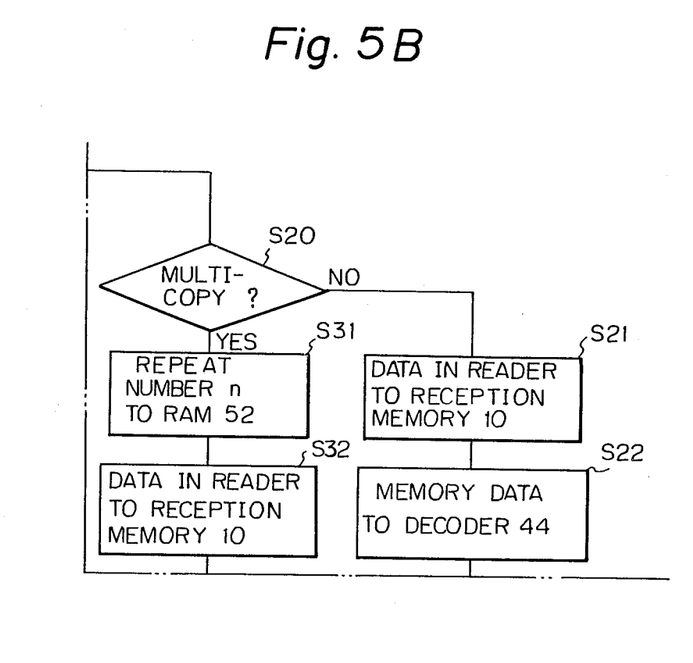
Figure 5C:
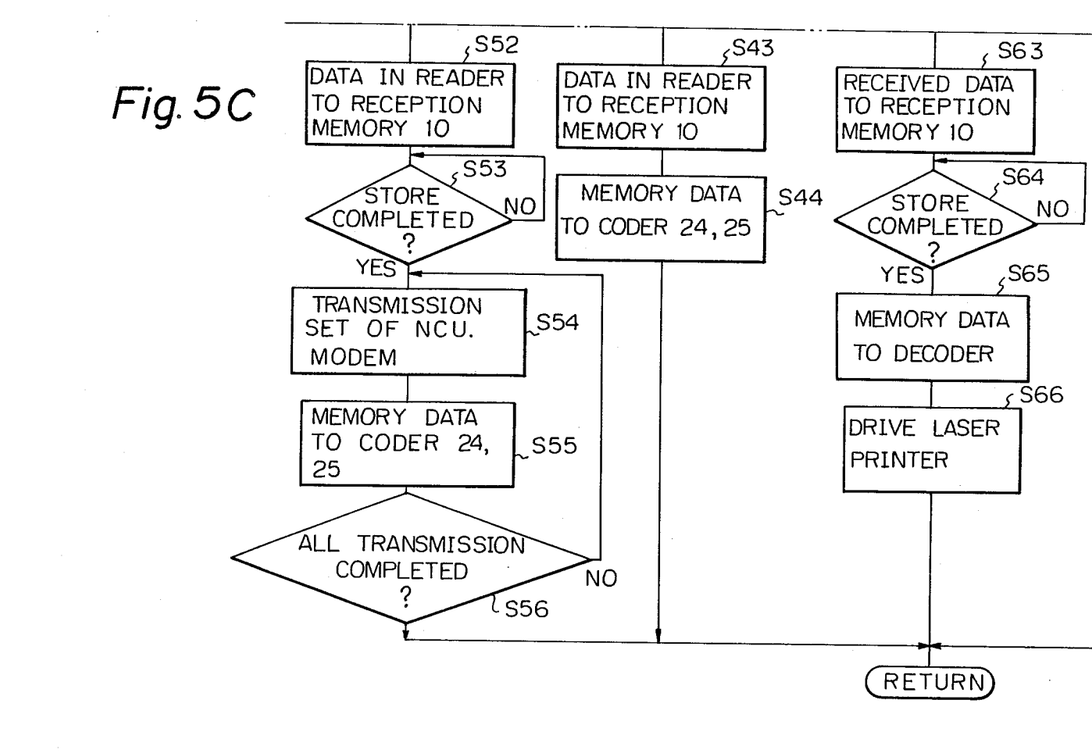
Figure 5D:
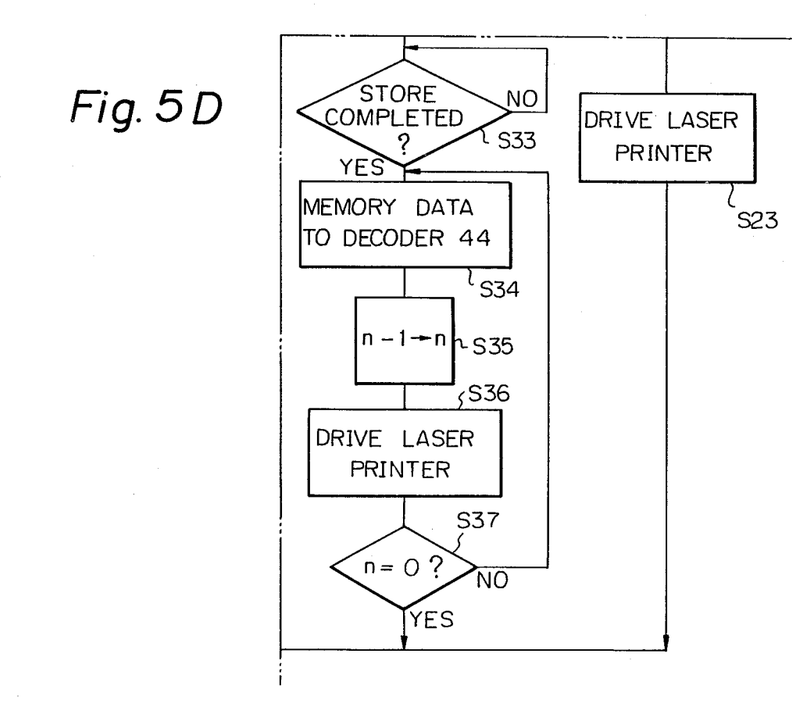

FIG. 5 is a flowchart showing the operation of the embodiment.

First, a start button and a copy key are pressed (step S10). A check is then made (step S20) to see if the copy mode is the multicopy mode or the single copy mode from a value of a ten-key to input a copy quantity. When the original is copied by only one, the CPU 50 drives the image reading unit 100 and intermediate coder 22 through the reader interface 21 in order to read the image data of the original and thereafter the CPU 50 converts the image data to an intermediate code and stores this intermediate code into the image memory 10 by making an address counter in the memory management circuit 11 operative (sep S21). This intermediate code is converted to a video signal (image data) by the decoder 44 (step S22) and the laser printer 200 is driven on the basis of this video signal (step S23). In this case, the image memory 10 is used as a buffer to store the data as much as a few lines.

In the multicopy mode, a repeat number n is stored into the RAM 52 (step S31). After the data from the reading unit 100 was converted, it is stored into the image memory 10 similarly to step S21. Upon storage, a check is made to see if the data of one page of the original has been stored into the image memory or not (step S33). Whenever the original is read by one line, an end of line (EOL) signal is generated from the reader interface 21. Therefore, by counting the EOL signal of one page or due to the continuous generation of the EOL signals or by way of the management circuit 11, it is possible to discriminate whether the image data of one page has been completely read or not. Similarly to step S22, the memory data as the intermediate code is converted to a video signal by the decoder 44 and the laser printer 200 is driven (step S36). The repeat number n is decreased by only "1" (step S35). These operations are repeated n times (step S37).

On the other hand, when the copy key is not pressed, namely, if NO in step S10, a check is made to see if a transmission key has been pressed or not (step S40). If YES in step S40, a check is made to see if a (parallel or sequential) broadcasting transmission key has been pressed or not (step S41).

In the case of the broadcasting transmission, the destination data inputted by the ten-key is stored into the RAM 52 (step S51). By pressing an input completion key of this destination data, the data from the reading unit 100 is converted to the intermediate code and then stored into the image memory 10 (step S52). Upon completion of the storage of the image data of one page of the original, the modem 30 and NCU 31 are set to the transmitting mode with respect to the first destination (step S54). The data read out from the memory 10 is converted to the MH code or MR code by the MH coder 24 or MR coder 25 (step S55) and sent onto the line 400. These operations are executed with respect to all destinations (step S56). In this case, each time the original image is transmitted, the destination data stored in the RAM 52 is cleared one by one.

In the case of a single destination, after the modem 30 and NCU 31 were set to the transmitting mode (step S42), the read data is stored into the image memory 10 (step S43) and the data is coded by the coder 24 or 25 and sent onto the line 400 (step S44).

In the case of the reception (step S61), the modem 30 and NCU 31 are set to the receiving mode (step S62). The received data is converted to the intermediate code by the MH intermediate decoder 41 or MR intermediate decoder 42 and this intermediate code is stored into the memory 10 (step S63). Upon completion of the storage of the data of one page of the original (step S64), the intermediate code read out from the image memory 10 is converted to the video signal by the decoder 44 (step S65) and the laser printer 200 is driven on the basis of this video signal (step S66).

The fundamental recording resolution of the laser printer 200 is set to 16 pels/mm × 15.4 lines/mm. Therefore, in the case where the image data is received from an ordinary facsimile apparatus (having the specifications of 8 pels/mm × 7.7 lines/mm or 4 pels/mm × 3.85 lines/mm) (in the case of steps S61 to S65), the dots are overlapped by the pixel density conversion circuit 45 and the data is outputted. Practically speaking, the received data is multiplexed by every predetermined number of times (e.g., two or four times) on a dot unit basis and sent to the decoder 44. At the same time the resultant data is multiplexed by every predetermined number of times (e.g., two or four times) on a line unit basis and sent to the decoder 44. Due to such a multiplexing method, even when the laser printer 200 is used, the image size on the print paper is not reduced upon reception. This also similar to the case of using other high-speed printer of an ordinary paper such as a thermal transfer copying printer or the like. In addition, it is possible to control the reading operation from the image memory 10 so that the image data is multiplexed and outputted in a manner similar to the above through the image memory management circuit 11 under control of the CPU 50 without using the image density conversion circuit 45.

As described above, upon reception, after the received data has once been stored in the image memory, it is outputted to the printer, so that the printer can perform the recording operation at a high speed. Thus, a high-speed printer of a high resolution such as a laser beam printer can be used as a printer.

On one hand, the image memory is commonly used as the broadcasting transmission memory, reception memory, and retention memory for multicopy, so that the memory capacity can be reduced.

Further, the pixel density of the transmitting image data can be converted in accordance with the recording pixel density on the reception side, so that the image data can be also transmitted even to a plurality of destination apparatuses (on the reception side) having different recording pixel densities without changing the image size. Also, in this case, the pixel density of the image data to be stored in the image memory can be always kept constant.

In addition, since the pixel density of the received image data can be converted in accordance with the pixel density of the printer, the image data can be received without changing the image size irrespective of the received pixel density.

The present invention is not limited to the foregoing embodiment but many modifications and variations are possible within the spirit and scope of the appended claims of the invention.

What I claim is:

1. An image communicating system comprising:
   reading means for reading an original image;
   first coding means for coding an image signal obtained by said reading means to a first code signal;
   receiving means for receiving an image signal transmitted through a communication line;
   second coding means for coding the image signal transmitted through said communication line to a second code signal;
   an image memory for selectively storing either the first code signal or the second code signal;
   recording means for reading out, decoding and recording the image signal stored in said image memory;
   converting means for converting the image signal of a first resolution read out from said image memory to an image signal of a second resolution;
   third coding means for coding the image signal of the second resolution to a third code signal; and
   transmitting means for transmitting the third code signal to a reception side through the communication line.

2. An image communicating system according to claim 1, wherein said transmitting means selects the second code format and the second code resolution in accordance with a decoding function and a resolution at the reception side.

3. An image communication system according to claim 2, wherein said transmitting means includes a broadcasting function for transmitting to a plurality of reception sides.

4. An image communicating system according to claim 1, wherein said recording means is a laser recording apparatus.

5. An image communication system comprising:
   generating means for generating an original image signal;
   coding means for coding the original image signal to a code signal;

an image memory for storing the code signal;
converting means for converting the code signal;
converting means for converting the code signal stored in said image memory into a converted image signal, which corresponds to a function on a reception side; and
transmission means for transmitting the converted image signal to the reception side through a communication line.

6. An image communication system according to claim 5, wherein said converting means converts a data density of the code signal.

7. An image communication system according to claim 5, wherein said converting means converts the code signal to a plurality of such converted image signals, each of which corresponds to a function on a respective one of a plurality of reception sides, and wherein said transmission means performs a broadcasting transmission of the plurality of converted image signals to respective ones of the plurality of reception sides.

8. An image communicating system comprising:
generating means for generating an original image signal;
first coding means for coding the original image signal to a first code signal;
an image memory for storing the first code signal;
converting means for converting a data density of the first code signal stored in said image memory into a converted code signal, in accordance with a function on a reception side;
second coding means for coding the converted code signal to a second code signal which is different from the first code signal; and
transmission means for transmitting the second code signal to the reception side through a communication line.

9. An image communicating system according to claim 8, wherein said second coding means codes the first code signal to the second code signal, in accordance with the function on the reception side.

10. An image communicating system according to claim 9, wherein said second coding means further comprises:
means for coding the converted code signal in accordance with a second coding method to produce the second code signal; and
means for coding the converted code signal in accordance with a third coding method to produce the second code signal,
wherein said second coding means selects one of said second and third coding methods according to the function on the reception side.

11. An image communicating system according to claim 10, wherein said second coding method includes a modified Huffman coding method, and said third coding method includes a modified READ coding method.

12. An image communicating system according to claim 8, wherein said converting means converts the first code signal into a plurality of such converted code signals, each of which corresponds to a function on a respective one of a plurality of reception sides, wherein said second coding means codes each of the converted code signals to a respective second code signal, and wherein said transmission means performs a broadcasting transmission of each of the plurality of second code signals to a respective one of the plurality of reception sides.

13. An image transmitting system comprising:
generating means for generating an original image signal;
first coding means for coding means for coding the original image signal to a first code signal;
an image memory for storing the first code signal;
second coding means for coding the first code signal stored in said image memory to a second code signal;
third coding means for coding the first code signal stored in said image memory to a third code signal; and
transmission means for selectively transmitting the second code signal or the third code signal.

14. An image transmitting system according to claim 13, wherein said transmission means selects said second coding means or said third coding means in accordance with a function on a reception side.

15. An image transmitting system according to claim 13, further comprising converting means for converting a data density of the first code signal stored in said image memory, in accordance with a function on a reception side.

16. An image transmitting system according to claim 13, wherein said second coding means codes the first code signal in accordance with a modified Huffman coding method, and aid third coding means codes the first code signal in accordance with a modified READ coding method.

17. An image transmitting system according to claim 13, wherein said transmission means performs a broadcasting transmission of the first code signal stored in said image memory to a plurality of reception sides.

* * * * *

UNITED STATES PATENT AND TRADEMARK OFFICE
CERTIFICATE OF CORRECTION

PATENT NO. : 4,814,890
DATED : March 21, 1989
INVENTOR(S) : YOSHIAKI KATO

It is certified that error appears in the above-identified patent and that said Letters Patent is hereby corrected as shown below:

COLUMN 2, line 27, "an" should be deleted;

line 33, "multicopy" should read --multicopying--.

COLUMN 5, line 60, "also" should read --is also--.

COLUMN 7, line 2 should be deleted.

COLUMN 8, line 22, "means for coding" (second occurrence) should be deleted;

line 45, "aid" should read --said--.

Signed and Sealed this

Twelfth Day of December, 1989

Attest:

JEFFREY M. SAMUELS

*Attesting Officer*    *Acting Commissioner of Patents and Trademarks*